US008797342B2

(12) United States Patent (10) Patent No.: US 8,797,342 B2
Okunev (45) Date of Patent: Aug. 5, 2014

(54) METHOD FOR VISUAL PROJECT MODELING

(75) Inventor: Dmitriy Okunev, Lawrenceville, NJ (US)

(73) Assignee: Siemens Aktiengesellschaft, Munich (DE)

( * ) Notice: Subject to any disclaimer, the term of this patent is extended or adjusted under 35 U.S.C. 154(b) by 221 days.

(21) Appl. No.: 13/228,514

(22) Filed: Sep. 9, 2011

(65) Prior Publication Data

US 2012/0062582 A1    Mar. 15, 2012

Related U.S. Application Data

(60) Provisional application No. 61/381,544, filed on Sep. 10, 2010.

(51) Int. Cl.
  *G06T 11/20*   (2006.01)
  *G09G 5/02*    (2006.01)
  *G06Q 10/00*   (2012.01)
  *G06F 17/50*   (2006.01)

(52) U.S. Cl.
  CPC ................................ *G06T 11/206* (2013.01)
  USPC ............... 345/589; 345/441; 705/28; 705/29

(58) Field of Classification Search
  CPC ..... G06Q 10/00; G06Q 10/06; G06Q 10/063; G06Q 10/067; G06Q 10/08; G06Q 10/083; G06Q 10/087; G06Q 10/0875
  USPC ............................... 345/441, 589; 705/28, 29
  See application file for complete search history.

(56) References Cited

U.S. PATENT DOCUMENTS

| | | | |
|---|---|---|---|
| 4,827,423 A | 5/1989 | Beasley et al. | |
| 4,847,761 A | 7/1989 | Ferriter et al. | |
| 4,862,376 A | 8/1989 | Ferriter et al. | |
| 4,924,385 A | 5/1990 | Dote | |
| 5,109,337 A * | 4/1992 | Ferriter et al. | 705/29 |
| 5,197,001 A | 3/1993 | Mukherjee | |
| 6,223,094 B1 * | 4/2001 | Muehleck et al. | 700/107 |
| 6,961,687 B1 * | 11/2005 | Myers et al. | 703/6 |
| 6,983,187 B2 * | 1/2006 | Kern | 700/97 |
| 7,289,859 B2 * | 10/2007 | Miwa et al. | 700/97 |
| 2003/0023518 A1 * | 1/2003 | Spriggs et al. | 705/28 |
| 2005/0021877 A1 * | 1/2005 | Varpela et al. | 710/1 |
| 2007/0106486 A1 * | 5/2007 | Pascarella et al. | 703/6 |
| 2007/0165031 A1 * | 7/2007 | Gilbert et al. | 345/473 |
| 2007/0224585 A1 * | 9/2007 | Gerteis et al. | 434/350 |
| 2007/0240118 A1 * | 10/2007 | Keren | 717/124 |
| 2008/0168357 A1 * | 7/2008 | Firebaugh et al. | 715/737 |
| 2009/0125530 A1 * | 5/2009 | Martinsson et al. | 707/100 |
| 2010/0168874 A1 * | 7/2010 | Lucas et al. | 700/17 |
| 2010/0287512 A1 * | 11/2010 | Gan et al. | 715/854 |
| 2011/0213728 A1 * | 9/2011 | Rheaume | 705/342 |
| 2014/0040081 A1 * | 2/2014 | Marwah et al. | 705/29 |

OTHER PUBLICATIONS

Freetutes Systems Analysis and Design—Complete Introductory Tutorial for Software Engineering 2009, www.freetutes.com/systemanalysis (accessed Oct. 28, 2013).*

* cited by examiner

*Primary Examiner* — Xiao Wu
*Assistant Examiner* — Michael J Cobb (57) ABSTRACT

A method, apparatus and computer-readable medium for generating a graphical tree based on a hierarchical structure includes receiving a request to convert a first hierarchical structure into a first graphical tree. Each of a plurality of elements of the first hierarchical structure, and the relationships among the plurality of elements are identified. A first graphical tree is generated based on each of the plurality of elements and the relationships among the elements. The first graphical tree is then displayed. Additional graphical trees can be displayed simultaneously and associations between nodes of the different graphical trees can be designated.

6 Claims, 8 Drawing Sheets

METHOD FOR VISUAL PROJECT MODELING

CROSS REFERENCE TO RELATED APPLICATIONS

This application claims the benefit of U.S. Provisional Application No. 61/381,544 filed Sep. 10, 2010, which is incorporated herein by reference.

FIELD OF THE DISCLOSURE

The present disclosure relates generally to visual project modeling and more particularly to generating a graphical tree based on a hierarchical structure.

BACKGROUND OF THE INVENTION

Project development typically requires generation of documents or lists such as a bill of materials (BOM) and additional information. For example, a project for producing a product may include generation of a BOM, functional requirements of the product, and product specifications.

A BOM, functional requirements, and specifications for a project may be defined using a hierarchical structure. For example, the product may consist of a several main components wherein each main component includes several sub components. Although the hierarchical structure can be effectively used to generate a BOM and other lists, the hierarchical structure does not display information in a manner that is easy to comprehend.

BRIEF SUMMARY OF THE INVENTION

In one embodiment, a method for generating a graphical tree based on a hierarchical structure comprises receiving a request to convert a first hierarchical structure into a first graphical tree. The first hierarchical structure comprises a plurality of elements and relationships among the plurality of elements. Each of the plurality of elements of the first hierarchical structure and the relationships among the plurality of elements are identified. The first graphical tree is generated based on each of the plurality of elements and the relationships among the plurality of elements, the first graphical tree comprising a plurality of shapes, each of the plurality of shapes associated with a respective one of the plurality of elements. The first graphical tree is then displayed with each of the plurality of shapes including identifying text.

In one embodiment, the plurality of shapes of the first graphical tree are connected by branches based on the relationships among the plurality of elements of the hierarchical structure. A second graphical tree can be displayed simultaneously with the first graphical tree in response to a user request, the second graphical tree comprising a plurality of shapes connected by branches. User input can be received associating one of the plurality of shapes of the first graphical tree with one of the plurality of shapes of the second graphical tree. Association information can be stored in a file associated with the one of the plurality of shapes of the first graphical tree and in a file associated with the one of the plurality of shapes associated with the second graphical tree. Association information for a particular one of the plurality of shapes of the first graphical tree can be displayed in response to a user request to display association information. In one embodiment, the user request to display association information comprises a user moving a graphical cursor over the particular one of the plurality of shapes of the first graphical tree. In one embodiment, displaying the association information comprises highlighting the particular one of the plurality of shapes of the first graphical tree and highlighting a particular one of the plurality of shapes of the second graphical tree associated with the particular one of the plurality of shapes of the first graphical tree.

An apparatus for performing the above method and a computer-readable medium storing instructions for causing a computing device to perform operations similar to the above method are also disclosed.

These and other advantages of the invention will be apparent to those of ordinary skill in the art by reference to the following detailed description and the accompanying drawings.

DETAILED DESCRIPTION

The term project, as used herein, pertains to a plan for a product. A product can be small, such as a device, or large, such as a factory. Project planning often begins by identifying and modeling project requirements using a text based hierarchical structure. The requirements model defines how a user expects the product to function. The example project used herein to illustrate the inventive concept pertains to an aerodynamic bicycle and, more specifically, lighting for the aerodynamic bicycle.

Figure 1A:
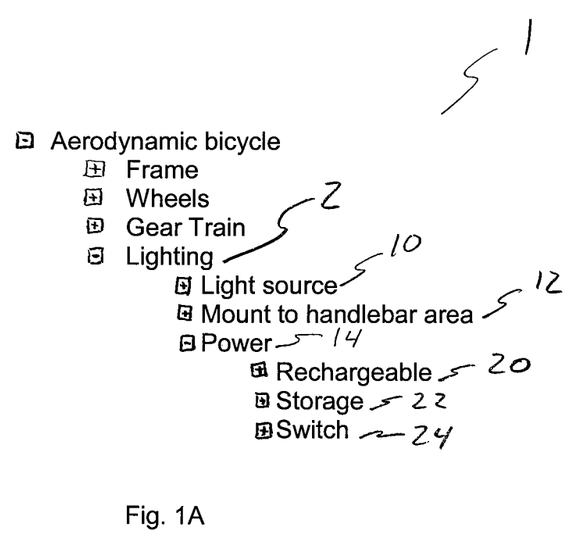
FIG. 1A depicts a hierarchical structure defining requirements for a project

FIG. 1A depicts hierarchical structure 1 identifying requirements for an aerodynamic bicycle. Although the project consists of multiple components including a frame, wheels, and a gear train, in order to illustrate the inventive concept, only the lighting for the bicycle will be considered in detail. A user generates hierarchical structure 1 by entering information into an editor operating on a user device (e.g., personal computer, laptop computer, or other computing device). Components and sub-components of specific components are identified by the user using, for example, a text interface. For example, light source 10, mount to handle bar area 12, and power 14 are all indented below lighting 2 thereby identifying 10, 12, and 14 to be subcomponents of lighting 2. Hierarchical structure 1 can be stored as a file. Since hierarchical structure 1 consists of only a few components, it is not exceedingly difficult to see the structure of the project as an assembly of components and sub-components. Hierarchical structure 1 is intentionally small so it can be used as an example to illustrate the inventive concept. Hierarchical structures for projects can be much larger and contain more components and sub-components which make it difficult to comprehend the overall project.

After a hierarchical structure is creating using the editor, a user can input a request (e.g., click an icon) to convert hierarchical structure 1 into a graphical representation (also referred to as graphical model). In response to the request, the graphical representation of requirements model 100 shown in FIG. 1B is generated.

Figure 1B:
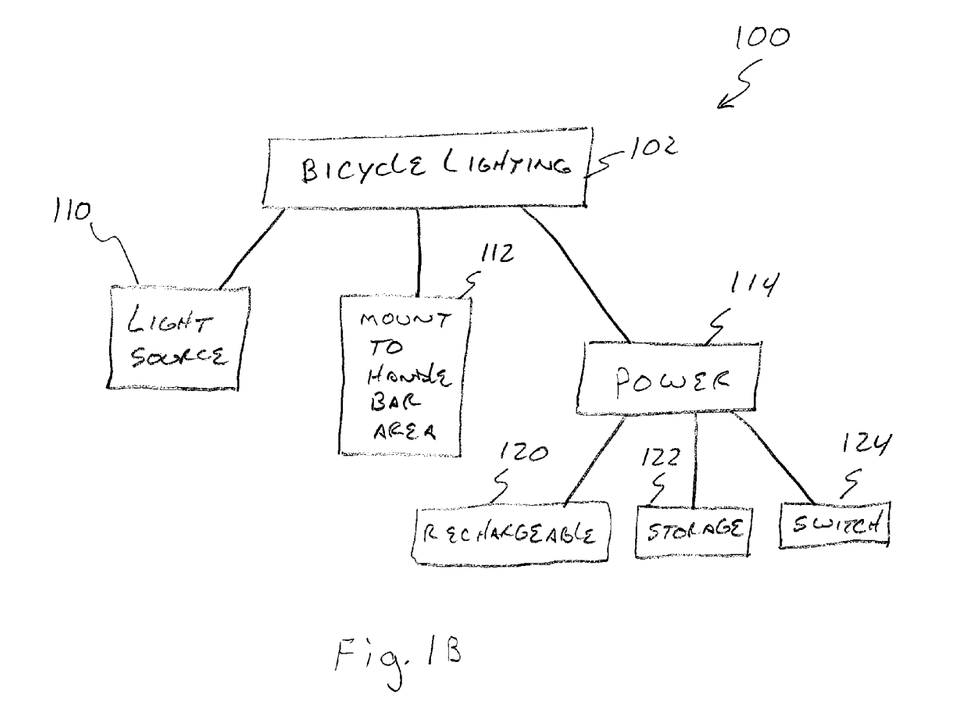
FIG. 1B depicts a graphical tree of a requirements model according to one embodiment.

FIG. 1B depicts a graphical tree of requirements model 100 for a bicycle lighting component which is associated with an aerodynamic bicycle project. Requirements model 100 is arranged as a graphical representation (i.e., a tree) of the information contained in hierarchical structure 1 shown in FIG. 1A. Requirements model 100 includes nodes connected by branches. Node 102 represents the bicycle lighting project which should operate to illuminate the area immediately in front of a bicycle. Branching from node 102 are nodes 110, 112, and 114, which further define bicycle lighting project 100. Light source 110 defines the requirement of providing a source of illumination. Mount to handle bar area 112 defines the requirement of facilitating mounting light source 110 to the handle bar area of a bicycle. Power 114 defines the requirement of a power source for light source 110. Power 114 is further defined by nodes 120, 122, and 124 which branch from power 114. Rechargeable 120 further defines that power 114 should be rechargeable. Storage 122 further defines that power 114 should be capable of storing energy. Finally, switch 124 defines that power 114 should be switchable to facilitate turning light source 110 on and off.

It should be noted that requirements models (as well as other models described below) can range in specificity. A requirements model can include additional detail defining constraints and user desires as necessary. For example, light source 110 could be further defined by the type of bulb required to be used or defined to require that a particular off-the-shelf light source be used. A requirements model can alternatively define broad requirements to allow multiple solutions to a particular requirement. For example, a power storage requirement could be satisfied by many types of batteries. In addition, power storage could be satisfied by a capacitor or a flywheel.

A functional model can be generated based on defined requirements. For example, a text based hierarchical functional model (not shown) can be generated based on the requirements defined in a related requirements model, such as requirements model 100. The functional model quantifies requirements by breaking down each requirement into high-level functions or functional groups that will be parameterized. The parameter values are behavior specifications, which turn the requirements into quantitative, testable statements of intent. For example, the requirement of a light source can be defined in a functional model based on how bright the light should be and the location and size of an area the light source should illuminate.

Figure 2:
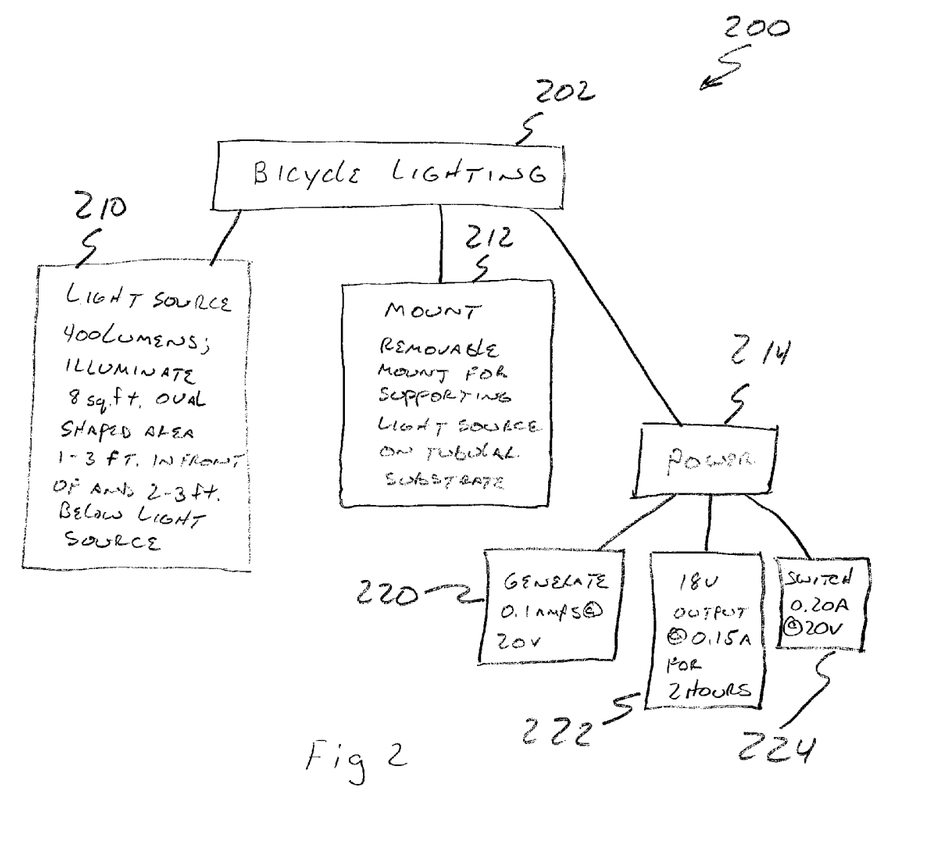
FIG. 2 depicts a graphical tree of a functional model according to one embodiment.

FIG. 2 depicts graphical tree of functional model 200 for the bicycle lighting project. Functional model 200, in one embodiment, is generated from a hierarchical structure in a manner similar to that described in connection with graphical tree 100 of FIG. 1B. Functional model 200, in one embodiment, is related to requirements model 100 shown in FIG. 1. Bicycle lighting 202 node identifies the functional model as pertaining to bicycle lighting. Light source 210 branches from bicycle lighting 202 and defines how a light source should function. Specifically, light source 210 node defines how light source 110 requirement shown in FIG. 1B should function in measurable terms. Light source 210 specifies that the light source for bicycle lighting should produce 400 lumens and illuminate an 8 square foot oval-shaped area one to 3 feet in front of and two to three feet below the light source.

Similarly, mount 212 defines how the requirement mount 112 of FIG. 1B should function. Mount 212 specifies that a mount should be removable for supporting a light source on a tubular substrate. Power 214 specifies how power 114 should function by defining how each of the three nodes (i.e., 120, 122, and 124 branching from power 114 should function. Node 220 branching from power 214 specifies that the requirement rechargeable 120 of FIG. 1B can be satisfied by the generation of 0.1 amps at 20 volts. Node 222 branching from power 214 specifies that the requirement storage 122 of FIG. 1B can be satisfied by an energy storage device capable of outputting 18 volts and 0.15 amps for two hours. Node 224 branching from power 214 specifies that the requirement switch 124 of FIG. 1B can be satisfied by a switch capable of switching 0.2 amps at 20 volts.

As described above, the nodes of the graphical tree of the functional model specify how the nodes of the requirements model can be satisfied. The nodes of the functional model quantify the nodes of the requirements model and provide parameters that may be used in testing prospective designs and components intended to satisfy the requirements model. The benefit of using a functional model is that the functional model defines how a particular requirement can be satisfied but may not specify a method that must be used to satisfy the particular requirement. For example, light source 210 indicates that light source requirement 110 can be satisfied by, inter alia, a light source producing 400 lumens. Functional node light source 210 does not specify what type of light source needs to be used if a specific type of light source is not required. Therefore, any light source (e.g., a light bulb such as incandescent bulb, an LED, or a halogen bulb, or other types of light sources such as an organic light source, etc.) that produces 400 lumens could be used to satisfy the 400 lumens specified by light source 210.

A graphical tree of a logical model can be generated based on information contained in graphical tree for requirements model 100 and graphical tree for functional model 200. The logical model can represent the physical layout of the project. In one embodiment, the logical model comprises nodes representing physical components that can satisfy respective nodes of the functional and requirements models.

Figure 3:
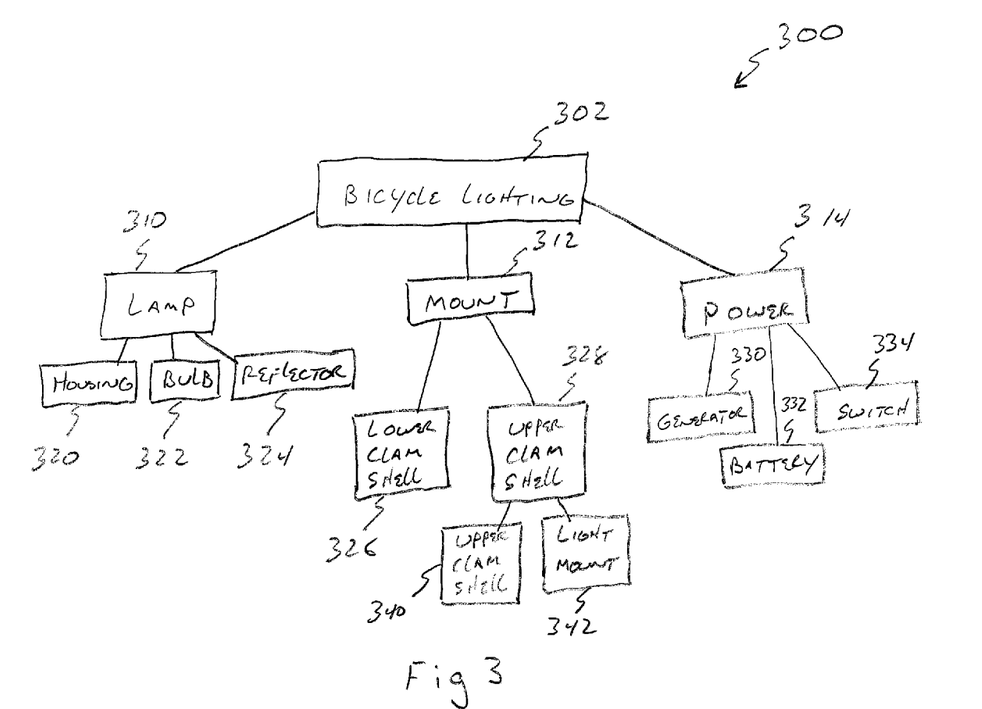
FIG. 3 depicts a graphical tree of a logical model according to one embodiment.

FIG. 3 depicts a graphical tree of logical model 300 identified as bicycle lighting 302 which, in one embodiment, is generated based on a logical model hierarchical structure (not shown). Three nodes branch from bicycle lighting 302 element, specifically, lamp 310, mount 312, and power 314 which specify components of bicycle lighting 302 element. Nodes branching from lamp 310 further define the physical structure of the lamp. Housing 320 represents the housing component of lamp 310. Although not shown, node 320 can be associated with additional information such as a part number and specifications for a housing which may be used. Similarly, bulb 322 and reflector 324 nodes are shown branching from lamp 310. Bulb 322 and reflector 324 can similarly be associated with additional information pertaining to possible physical components for use as a bulb and reflector, respectively. In the embodiment described, nodes (e.g., housing 320, bulb 322, and reflector 324) are associated with additional information such as part numbers and specifications. In other embodiments, other additional information can be associated with a node as well. For example, computer aided drafting (CAD) drawings can be associated with a node with the CAD drawings depicting a physical component corresponding to a node. Similarly, mathematical modeling files can be associated with a node and define the proposed operation of the node.

Mount 312 is a node identifying the mount portion of bicycle lighting 302 of logical model 300. Lower clam shell 326 and upper claim shell 328 branch from mount 312 and represent two halves of a specific type of mount which can be used for bicycle lighting 302. Upper clam shell 328 is shown divided further into two sub components, namely upper clam shell 340 and light mount 342 thereby identifying two specific portions of upper clam shell 328 element. Power 314 is shown divided into generator 330, battery 332, and switch 334. Each of the nodes shown in logical model 300 represent physical components which are selected or designed to satisfy corresponding nodes of requirements model 100 of FIG. 1 and functional model 200 of FIG. 2. For example, light source 110 shown in requirements model 100 of FIG. 1 indicates that bicycle lighting project 102 requires a light source. Light source 110 is defined in terms of parameters in light source 210 element of functional model 200 shown in FIG. 2. A light source which satisfies the parameters is defined by lamp 310 element of FIG. 3 which is divided into three nodes, namely, housing 320, bulb 322, and reflector 324.

Figure 4:
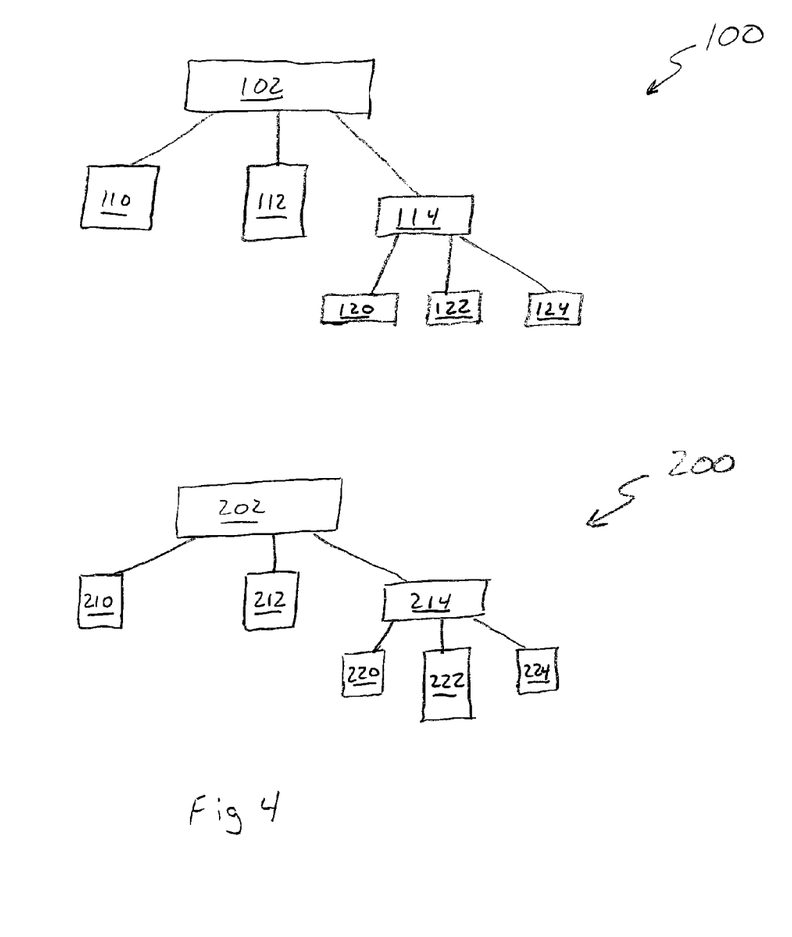
FIG. 4 depicts two graphical trees shown simultaneously.

FIG. 4 depicts a display showing two graphical trees simultaneously according to one embodiment. A user viewing a single, first, graphical tree can enter an input requesting an additional, second, graphical tree to be displayed simultaneously with the first graphical tree. For example, a user may click an icon indicating a desire to view an additional graphical tree. In response, the user is presented with a list of graphical trees available for display. In response to a user selecting one of the graphical trees available, the display is updated to show a first graphical tree and second graphical tree simultaneously as shown in FIG. 4.

FIG. 4 depicts requirements model graphical tree 100 shown located above functional model graphical tree 200. Graphical tree 100 and graphical tree 200 are the same as the graphical trees depicted in FIGS. 1B and 2 respectively but labeling has been omitted for clarity. The display of multiple graphical trees simultaneously facilitates the designation and viewing of relationships between nodes of different models. In one embodiment a user can select a node from each model and define a relationship between the two nodes. For example, a user can select node 102 of requirements model 100 and node 202 of functional model 200 by clicking on each of the nodes. A user can then indicate that the two chosen nodes should be associated to one another, for example, by clicking an association icon (not shown). In one embodiment, in response to the selection of nodes and subsequent clicking of the association icon, the user is presented with a pop-up window in which the user can enter information concerning the association. For example, the user can indicate that node 102 of requirements model 100 indicates that requirements on which the functions described in node 202 of functional model 200 are based. After the association between nodes 102 and 202 has been completed, the associated nodes can be identified, in one embodiment, by highlighting the nodes (e.g., changing the colors of the two nodes) when a graphical pointer is placed over one of the associated nodes. In addition, a pop-up window can appear displaying additional information pertaining to the association of the nodes.

It should be noted that although the graphical trees are shown separated horizontally, the graphical trees may be shown vertically (i.e., side by side) as well. In addition, more than two graphical trees can be displayed simultaneously. When more than two graphical trees are shown simultaneously, more than two nodes can be associated with one another in a manner similar to that described above for associating two nodes. In one embodiment, multiple graphical trees are displayed layered over one another with each layer slightly offset from the other layers to provide a user with an indication that more than one layer is shown. When displaying graphical trees in layers, nodes of the graphical trees that are associated with one another may be layered with one node almost directly over another thereby illustrating the association between the two nodes.

Figure 5A:
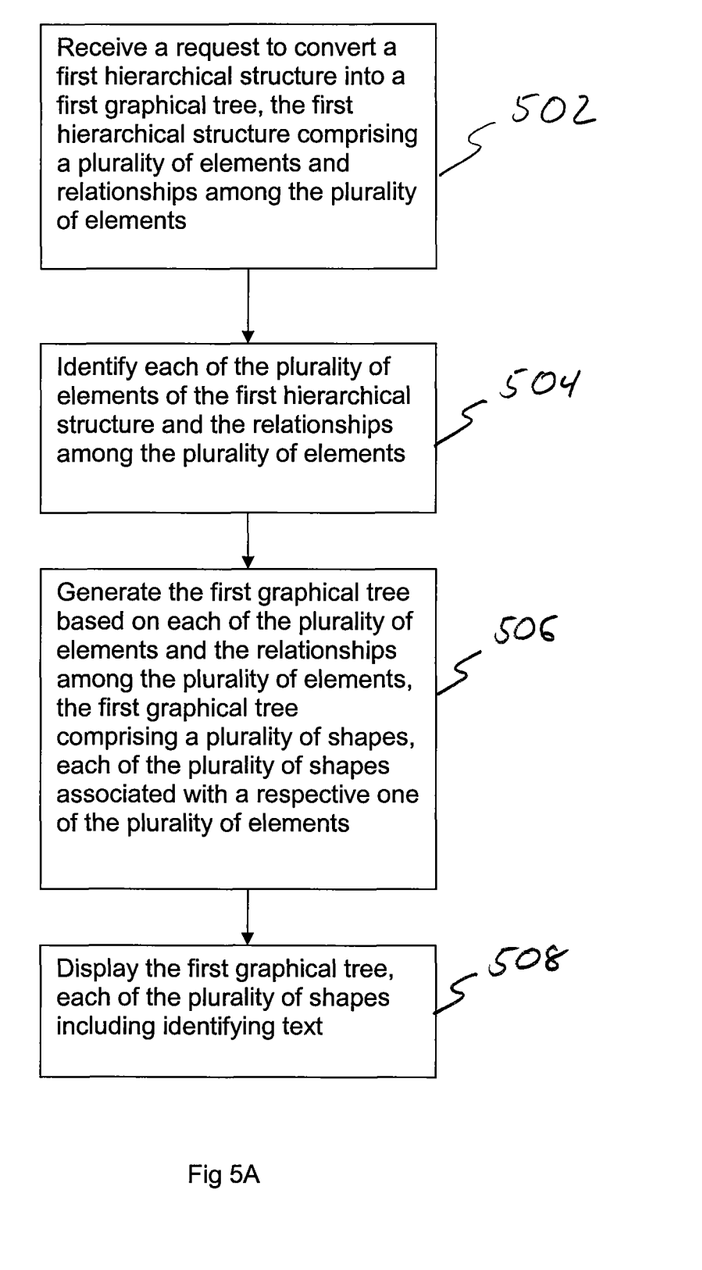
FIG. 5A depicts a flow chart of a method according to one embodiment.

FIG. 5A depicts a method for generating a graphical tree based on a hierarchical structure according to one embodiment. At step 502 a request to convert a first hierarchical structure into a first graphical tree is received, the first hierarchical structure comprising a plurality of elements and relationships among the plurality of elements. In one embodiment, the request identifies the hierarchical structure to be converted. A portion of a hierarchical structure may be identified for conversion as well, for example, by highlight the desired portion of the hierarchical structure to be converted. At step 504, each of the plurality of elements of the first hierarchical structure and the relationships among the plurality of elements is identified. For example, each of the elements shown in FIG. 1A (e.g., 2, 10, 12, 14, 20, 22, and 24) are identified as well as the relationships among the elements. For example, light source 10, mount to handlebar area 12 and power 14 elements are shown in FIG. 1A as being a subset of elements under Lighting 2 while rechargeable 20, storage 22 and switch 24 elements are shown in FIG. 1A as being a subset of elements under power 14. At step 506, the first graphical tree is generated based on each of the plurality of elements and the relationships among the plurality of elements. The first graphical tree comprises a plurality of shapes (also referred to as nodes) with each of the plurality of shapes associated with a respective one of the plurality of elements. At step 508, the first graphical tree is displayed with each of the plurality of shapes including identifying text. The identifying text, in one embodiment is the name associated with the respective element on which the shape is based. In one embodiment, additional information associated with each element can be displayed in the respective shape as well. Thus, the method shown in FIG. 5A can be used to convert a hierarchical structure, such as structure 1 shown in FIG. 1A, into a graphical tree, such as tree 100 shown in FIG. 1B. It should be noted that graphical models other than graphical trees can be generated using the method shown in FIG. 5A. For example, network models depicting components and connections among the components can be generated based on hierarchical structures describing these networks.

Figure 5B:
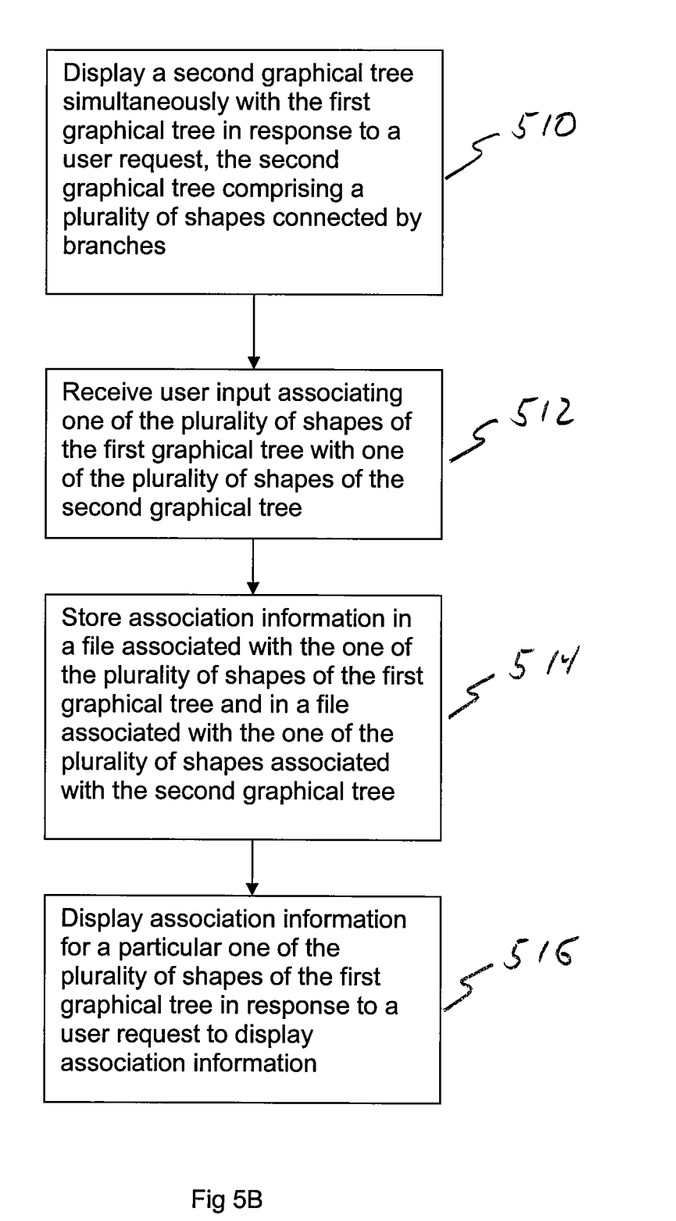
FIG. 5B depicts a flow chart of a method according to another embodiment.

FIG. 5B shows a method for displaying two graphical trees simultaneously and associating nodes of the graphical trees. At step 510, a second graphical tree is displayed simultaneously with the first graphical tree in response to a user request. The second graphical tree comprises a plurality of shapes (i.e., nodes) connected by branches and is shown simultaneously with the first graphical tree (e.g., graphical tree 100 and graphical tree 200 shown in FIG. 4). At step 512, user input is received associating one of the plurality of shapes of the first graphical tree with one of the plurality of shapes of the second graphical tree. At step 514, the association information is stored in a file associated with the one of the plurality of shapes of the first graphical tree and in a file associated with the one of the plurality of shapes associated with the second graphical tree. At step 516, association information for a particular one of the plurality of shapes of the first graphical tree is displayed in response to a user request to display the association information. This user request, in one embodiment, comprises a user moving a graphical cursor over the particular one of the plurality of shapes of the first graphical tree. In one embodiment, the association information is displayed by highlighting the particular one of the plurality of shapes of the first graphical tree and highlighting a particular one of the plurality of shapes of the second graphical tree associated with the particular one of the plurality of shapes of the first graphical tree.

In one embodiment, requirements model 100 shown in FIG. 1B can be created using a graphical user interface operating on a user device which supports the selection and placement of various shapes (representing nodes). For example, a graphical user interface which allows a user to select a one or more shapes and place the selected shapes in specific locations may be used. The shapes represent elements of the model, for example, the element bicycle lighting 102 of FIG. 1. In addition, the graphical user interface allows additional information to be associated with each shape/node placed in a specific location. For example, a particular element may be associated with a file which contains information related to the particular element. Additional models (e.g., functional model 200 shown in FIG. 2 and logical model 300 shown in FIG. 3) may be generated using a graphical user interface in a similar manner. These graphical models, in one embodiment, can be used to generate a hierarchical structure. For example, graphical tree requirements model 100 shown in FIG. 1B can be generated by a user using a graphical interface. Hierarchical structure 1 shown in FIG. 1A can then be generated based on graphical tree requirements model 100 shown in FIG. 1B since the elements and relationships among the elements can be determined from the graphical tree requirements model 100.

It should be noted that elements of a logical model can be representations of physical components. For example, elements of a logical model can be computer aided drafting models of components (e.g., physical parts). Elements of a logical model can also be simulations of physical components. Logical models can, in one embodiment, replace or facilitate the development of physical prototypes. Using logical models to replace physical prototypes can save time and money since developing logical models typically takes less time than building physical prototypes. In addition, the use of logical models can minimize the number of revisions to prototypes to obtain a component that satisfies the associated requirement and functional elements.

It should be noted that FIGS. 1B, 2, 3, and 4 depict requirements, functional, and logical models for a bicycle lighting project which, although part of a larger project, can be considered a single project.

The graphical user interface can provide a diagramming framework for generating models as graphical trees. The diagramming framework can be used to create, annotate, edit, revise, and define access controls for a model. In one embodiment, the graphical user interface supports standard models of various modeling languages such as SysML or UML2.

It should be noted that although only requirements, functional, and logical models have been described, additional models can be generated as well. Additional models (e.g., third, fourth, fifth and sixth models) can be generated as well by receiving input designating a plurality of elements associated with each additional model. Further, additional relationships between elements of different models can be input and displayed as well. These additional models may be generated in a manner similar to the method described above in connection with the generation of requirements model 1. The elements of additional models can be related to elements of other models as previously described as well.

In one embodiment, nodes of different models can be represented by different geometrical shapes. For example, in one embodiment, requirements nodes can be represented using circles, functional nodes using rectangles, and logical nodes using ovals. Other symbolic representation of nodes can be used as well. For example, nodes representing hardware can be represented using rectangles and nodes representing software can be represented using circles.

Figure 6:
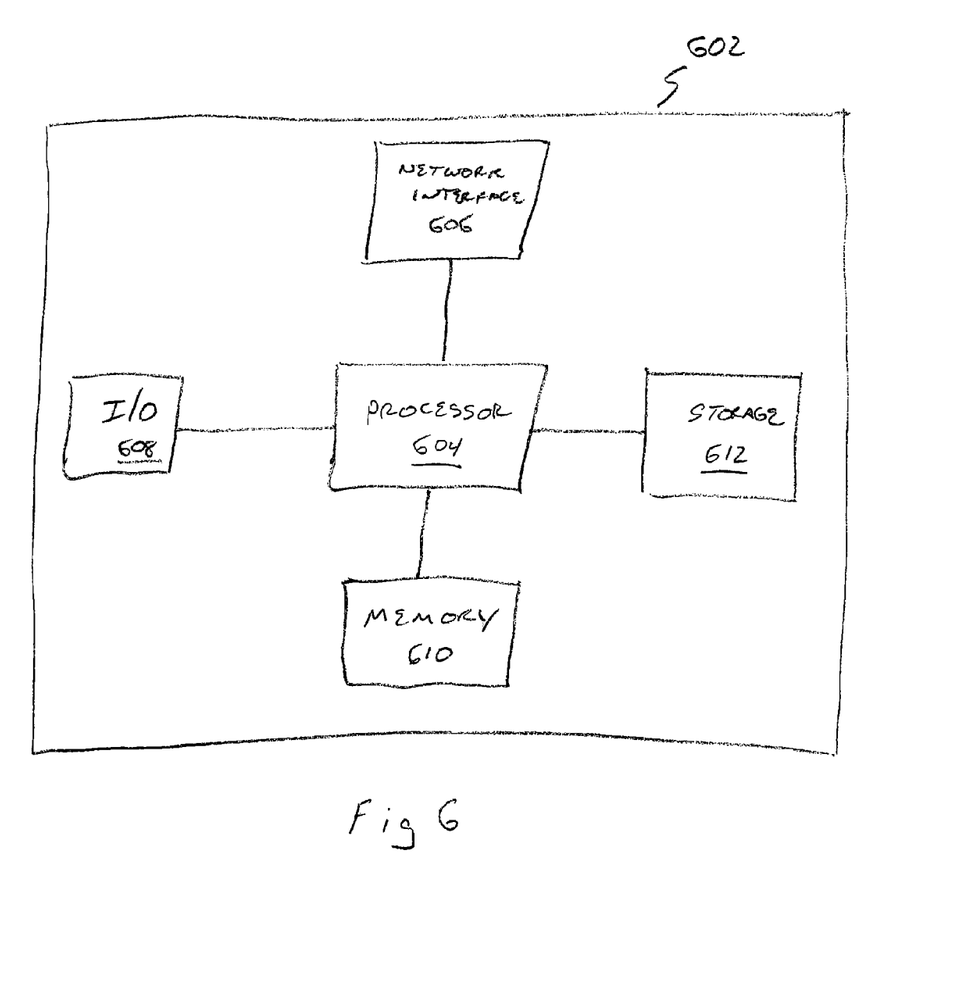
FIG. 6 depicts a high-level block diagram of a computer for displaying the models of FIGS. 1-4 and implementing the method of FIGS. 5A and 5B.

A user device for receiving input and displaying a visual model of a project as well as the methods depicted in FIGS. 5A and 5B may be implemented using a computer. A high-level block diagram of such a computer is illustrated in FIG. 6. Computer 602 contains a processor 604 which controls the overall operation of the computer 602 by executing computer program instructions which define such operation. The computer program instructions may be stored in a storage device 612, or other computer readable medium (e.g., magnetic disk, CD ROM, etc.), and loaded into memory 610 when execution of the computer program instructions is desired. Thus, the method steps of FIGS. 5A and 5B can be defined by the computer program instructions stored in the memory 610 and/or storage 612 and controlled by the processor 604 executing the computer program instructions. For example, the computer program instructions can be implemented as computer executable code programmed by one skilled in the art to perform an algorithm defined by the method steps of FIGS. 5A and 5B. Accordingly, by executing the computer program instructions, the processor 604 executes an algorithm defined by the method steps of FIGS. 5A and 5B. The computer 602 also includes one or more network interfaces 606 for communicating with other devices via a network. The computer 602 also includes input/output devices 608 that enable user interaction with the computer 602 (e.g., display, keyboard, mouse, speakers, buttons, etc.) One skilled in the art will recognize that an implementation of an actual computer could contain other components as well, and that FIG. 6 is a high level representation of some of the components of such a computer for illustrative purposes.

The foregoing Detailed Description is to be understood as being in every respect illustrative and exemplary, but not restrictive, and the scope of the inventive concept disclosed herein is not to be determined from the Detailed Description, but rather from the claims as interpreted according to the full breadth permitted by the patent laws. It is to be understood that the embodiments shown and described herein are only illustrative of the principles of the general inventive concept and that various modifications may be implemented by those skilled in the art without departing from the scope and spirit of the inventive concept. Those skilled in the art could implement various other feature combinations without departing from the scope and spirit of the inventive concept.

The invention claimed is:

1. A method comprising:
receiving a request to convert a first hierarchical structure into a first graphical tree representing a requirements model, the first hierarchical structure comprising a plurality of elements and relationships among the plurality of elements;
identifying each of the plurality of elements of the first hierarchical structure and the relationships among the plurality of elements;
generating the first graphical tree based on each of the plurality of elements and the relationships among the plurality of elements, the first graphical tree comprising a plurality of shapes, each of the plurality of shapes associated with a respective one of the plurality of elements;
displaying the first graphical tree representing the requirements model, each of the plurality of shapes including identifying text;

displaying a second graphical tree representing a functional model simultaneously with the first graphical tree in response to a first user request, the second graphical tree comprising a plurality of shapes connected by branches;

displaying a third graphical tree representing a logical model simultaneously with the first graphical tree and the second graphical tree in response to a second user request, the third graphical tree comprising a plurality of shapes connected by branches, the third graphical tree representing the logical model based on information from the first graphical tree representing the requirements model and the second graphical tree representing the functional model;

receiving user input associating one of the plurality of shapes of the first graphical tree associated with a requirements element with one of the plurality of shapes of the second graphical tree associated with a functional element;

storing association information in a file associated with the one of the plurality of shapes of the first graphical tree and in a file associated with the one of the plurality of shapes associated with the second graphical tree; and displaying association information for a particular one of the plurality of shapes of the first graphical tree in response to a user request to display association information, the user request to display association information comprising a user moving a graphical cursor over the particular one of the plurality of the shapes of the first graphical tree, the displaying association information comprising:

highlighting the particular one of the plurality of shapes of the first graphical tree;

highlighting a particular one of the plurality of shapes of the second graphical tree associated with the particular one of the plurality of shapes of the first graphical tree and highlighting a particular one of the plurality of shapes of the third graphical tree associated with the particular one of the plurality of shapes of the first graphical tree.

2. The method of claim 1 wherein the plurality of shapes of the first graphical tree are connected by branches based on the relationships among the plurality of elements of the hierarchical structure.

3. An apparatus comprising:

means for receiving a request to convert a first hierarchical structure into a first graphical tree representing a requirements model, the first hierarchical structure comprising a plurality of elements and relationships among the plurality of elements;

means for identifying each of the plurality of elements of the first hierarchical structure and the relationships among the plurality of elements;

means for generating the first graphical tree based on each of the plurality of elements and the relationships among the plurality of elements, the first graphical tree comprising a plurality of shapes, each of the plurality of shapes associated with a respective one of the plurality of elements;

means for displaying the first graphical tree representing the requirements model, each of the plurality of shapes including identifying text; means for displaying a second graphical tree representing a functional model simultaneously with the first graphical tree in response to a first user request, the second graphical tree comprising a plurality of shapes connected by branches;

means for displaying a third graphical tree representing a logical model simultaneously with the first graphical tree and the second graphical tree in response to a second user request, the third graphical tree comprising a plurality of shapes connected by branches, the third graphical tree representing the logical model based on information from the first graphical tree representing the requirements model and the second graphical tree representing the functional model;

means for receiving user input associating one of the plurality of shapes of the first graphical tree associated with a requirements element with one of the plurality of shapes of the second graphical tree associated with a functional element;

means for storing association information in a file associated with the one of the plurality of shapes of the first graphical tree and in a file associated with the one of the plurality of shapes associated with the second graphical tree; and means for displaying association information for a particular one of the plurality of shapes of the first graphical tree in response to a user request to display association information, the user request to display association information comprising a user moving a graphical cursor over the particular one of the plurality of shapes of the first graphical tree, the means for displaying association information comprising:

means for highlighting the particular one of the plurality of shapes of the first graphical tree;

means for highlighting a particular one of the plurality of shapes of the second graphical tree associated with the particular one of the plurality of shapes of the first graphical tree; and means for highlighting a particular one of the plurality of shapes of the third graphical tree associated with the particular one of the plurality of shapes of the first graphical tree.

4. The apparatus of claim 3 wherein the plurality of shapes of the first graphical tree are connected by branches based on the relationships among the plurality of elements of the hierarchical structure.

5. A non-transitory computer-readable medium having instructions stored thereon, the instructions in response to execution by a computing device cause the computing device to perform operations comprising:

receiving a request to convert a first hierarchical structure into a first graphical tree representing a requirements model, the first hierarchical structure comprising a plurality of elements and relationships among the plurality of elements;

identifying each of the plurality of elements of the first hierarchical structure and the relationships among the plurality of elements;

generating the first graphical tree based on each of the plurality of elements and the relationships among the plurality of elements, the first graphical tree comprising a plurality of shapes, each of the plurality of shapes associated with a respective one of the plurality of elements;

displaying the first graphical tree representing the requirements model, each of the plurality of shapes including identifying text;

displaying a second graphical tree representing a functional model simultaneously with the first graphical tree in response to a first user request, the second graphical tree comprising a plurality of shapes connected by branches;

displaying a third graphical tree representing a logical model simultaneously with the first graphical tree and the second graphical tree in response to a second user request, the third graphical tree comprising a plurality of shapes connected by branches, the third graphical tree representing the logical model based on information from the first graphical tree representing the requirements model and the second graphical tree representing the functional model;

receiving user input associating one of the plurality of shapes of the first graphical tree associated with a requirements element with one of the plurality of shapes of the second graphical tree associated with a functional element;

storing association information in a file associated with the one of the plurality of shapes of the first graphical tree and in a file associated with the one of the plurality of shapes associated with the second graphical tree; and displaying association information for a particular one of the plurality of shapes of the first graphical tree in response to a user request to display association information, the user request to display association information comprising a user moving a graphical cursor over the particular one of the plurality of shapes of the first graphical tree, the displaying association information comprising:

highlighting the particular one of the plurality of shapes of the first graphical tree;

highlighting a particular one of the plurality of shapes of the second graphical tree associated with the particular one of the plurality of shapes of the first graphical tree and highlighting a particular one of the plurality of shapes of the third graphical tree associated with the particular one of the plurality of shapes of the first graphical tree.

6. The non-transitory computer-readable medium of claim 5 wherein the plurality of shapes of the first graphical tree are connected by branches based on the relationships among the plurality of elements of the hierarchical structure.

* * * * *